United States Patent [19]
Kneller

[11] Patent Number: 5,568,189
[45] Date of Patent: Oct. 22, 1996

[54] AERIAL SUPPORT PLATFORM MECHANISM WITH FIVE AXES OF MOTION

[76] Inventor: Paul J. Kneller, 66 Dunn Ave., Apt. #2, Toronto, Ontario, Canada, M6K 2R6

[21] Appl. No.: 264,081

[22] Filed: Jun. 21, 1994

[51] Int. Cl.⁶ .............................. H04N 5/30; F16L 3/00; G03B 39/00; G03B 1/00
[52] U.S. Cl. ..................... 348/144; 348/157; 348/373; 248/58; 352/197; 254/264; 33/1 M; 396/12
[58] Field of Search ..................................... 348/143, 373, 348/376, 157, 142, 144; 901/16, 21; 414/590; 212/76; 248/550, 58; 354/74; 352/197; 254/264; 33/1 M; H04N 5/225, 5/30; F16L 3/00; G03B 39/00, 1/00

[56] References Cited

U.S. PATENT DOCUMENTS

| | | | |
|---|---|---|---|
| 2,055,673 | 9/1936 | Smilie | 212/19 |
| 2,190,093 | 2/1940 | Bossart | 304/17 |
| 3,324,239 | 6/1967 | Jacobson | 178/6.8 |
| 3,333,713 | 8/1967 | Cruciani | 212/76 |
| 4,081,830 | 3/1978 | Mick et al. | 348/155 |
| 4,507,044 | 3/1985 | Hutchins et al. | 414/744 R |
| 4,625,938 | 12/1986 | Brown | 248/550 |
| 4,710,819 | 12/1987 | Brown | 358/229 |
| 4,781,517 | 11/1988 | Pearce et al. | 414/590 |
| 5,113,768 | 5/1992 | Brown | 104/112 |
| 5,225,863 | 7/1993 | Weir-Jones | 354/81 |

FOREIGN PATENT DOCUMENTS 1516342  10/1989  U.S.S.R. ............. B25J 5/02

*Primary Examiner*—Wendy Greening
*Assistant Examiner*—Andrew B. Christensen
*Attorney, Agent, or Firm*—Ridout & Maybee

[57] ABSTRACT

An aerial support platform is supported to extend below, and intermediate of, a pair of parallel cables mounted along respective opposite walls of a studio. A carriage rides on each of the parallel cables, and another pair of cables extends to connect the pair of carriages. A third carriage sits on the other pair of cables, and a series of further cables extend vertically from that carriage to the platform. The pair of carriages positioned on the opposite walls of the studio are controlled to move in tandem, and the third carriage has controlled movement between those carriages. The platform may be raised or lowered relative to the third carriage, and thus has three linear axes of motion. The platform has two additional axes of motion, both rotational. One is around a vertical axis and another is around an axis normal to the vertical axis. Cinematographic equipment may be fixed to the platform, which can then be oriented using a computer at a remote location.

8 Claims, 12 Drawing Sheets

AERIAL SUPPORT PLATFORM MECHANISM WITH FIVE AXES OF MOTION

FIELD OF THE INVENTION

The invention relates to an aerial support platform mechanism for cinematographic and similar uses, more particularly to a mechanism having a platform supported to extend below and intermediate of a pair of parallel guide members, and having three linear axes of motion and two rotational axes of motion.

BACKGROUND OF THE INVENTION

Various suspension systems for supporting equipment in aerial locations are known. Such systems are particularly important in the making of motion pictures, where cinematographic equipment has to be suspended at high elevations to capture panoramic views. A boom mounted on a vehicle may give the necessary height, or it may be possible to use the roof of a nearby building. However, systems which are not ground-based are increasingly being used, i.e. systems that use cables or similar means for suspension. U.S. Pat. No. 4,710,819, granted to Garrett W. Brown on Dec. 1, 1987, discloses one such system. It uses at least three flexible members, such as cables, to suspend an equipment support member inside of a support structure. Each of the flexible members extends around a pulley on the support structure, and has one end connected to the equipment support member and the other end connected to a motor assembly controlled by a computer. The relative movement of the flexible members is synchronized by the computer, and this arrangement allows a computer operator to control the position of the support member within the support structure. A somewhat similar concept for directing an underwater exploration device is disclosed in U.S. Pat. No. 3,324,239, granted to I. C. Jacobson on Jun. 6, 1967.

Numerous difficulties have been found to exist with the suspension system of Brown. A major problem is stress on the cables; because of the angles involved, supporting an item weighing several hundred pounds may create a tension in the cables many times higher; the cables have been known to break under such stress. Brown's three-cable and four-cable systems incorporate no redundancy; if a cable breaks, the supported item freely falls. A related problem with the Brown system is the stress placed on the motor assemblies to which the tables connect. The motors are under continual pressure to maintain tension on the cables, which leads to their frequent burn out. Another serious problem that has been experienced with the Brown system is creation of wave motion in the Cables; this results in serious problems for cinematographers and others who require a highly stable camera platform with smooth movement.

The aerial support platform mechanism of the subject invention has a redundancy built into its cable system; if a support cable should break, a parallel drive cable takes on the support cable load and prevents the supported item from falling. Because the vertical cables in the subject invention only have to carry the weight of the supported item and are not part Of the overall suspension system as in the Brown system, those cables can be made considerably thinner than is possible with Brown's system. That allows the vertical cables supporting a camera on a first platform member of the invention to be invisible to a second camera on a second platform member, even if the separation between the two is only a few feet. Because the motors of the subject platform mechanism only act to move carriages and not to support cables as in Brown, the motors have little or no burn out. The cables of the subject platform mechanism experience negligible wave motion because the start/stop portion of the software that controls movement has a built-in inertia compensation, similar to that found in modern elevator control systems.

SUMMARY OF THE INVENTION

The invention is an aerial support platform mechanism having a pair of parallel first guide means, transverse second guide means, and vertical third guide means. It also has a pair of first carriages, each supported on a respective one of the first guide means and having a first movement means for moving it along the respective first guide means. The transverse guide means extends between the pair of first carriages, and supports a second carriage and a second movement means for moving that carriage along the second guide means. The vertical guide means extends downward from the second carriage, and supports a platform member and a third movement means for moving moving the platform member relative to the third guide means. The platform member has a frame connected to the third guide means, and also has a platform connected to the frame. The platform is rotatable around two axes relative to the frame by means of a fourth and a fifth movement means. The mechanism also has a control means for controlling movement of the first, second, third, fourth and fifth movement means.

Each first guide means may be a cable, and each first carriage may have a wheel means riding on the respective cable. The second guide means may be a cable that extends between the pair of first carriages, and the second carriage may have a wheel means riding on that cable. The third guide means may be a series of cables that extend between the second carriage and the frame of the platform member.

The platform of the platform member may be connected to the frame for rotation around a vertical first axis and around a second axis extending generally normal to the first axis. A disk member may be rotatably connected to the frame for rotation around a vertical first axis, and the platform may be rotatably connected to the disk member for rotation around an axis extending generally normal to the first axis.

Each first movement means may comprise a first cable loop that extends between a first driven pulley and a second pulley, and connects to a respective first carriage at a point intermediate the first and second pulleys. The second movement means may comprise a second cable loop that extends between a third driven pulley and a fourth pulley, and connects to the second carriage at a point intermediate the third and fourth pulleys. The third pulley may be secured to one first carriage, and the fourth pulley may be secured to the other first carriage. Alternatively or additionally, the third and fourth pulleys may be secured to respective opposite ends of the second guide means.

An extended aerial support platform mechanism may comprise a series of the basic platform mechanisms described above, each of the basic mechanisms having a single common first guide means.

SHORT DESCRIPTION OF THE DRAWINGS

The platform mechanism of the invention will next be further described by means of a preferred embodiment, utilizing the accompanying drawings, in which.

DESCRIPTION OF A PREFERRED EMBODIMENT

Figure 1:
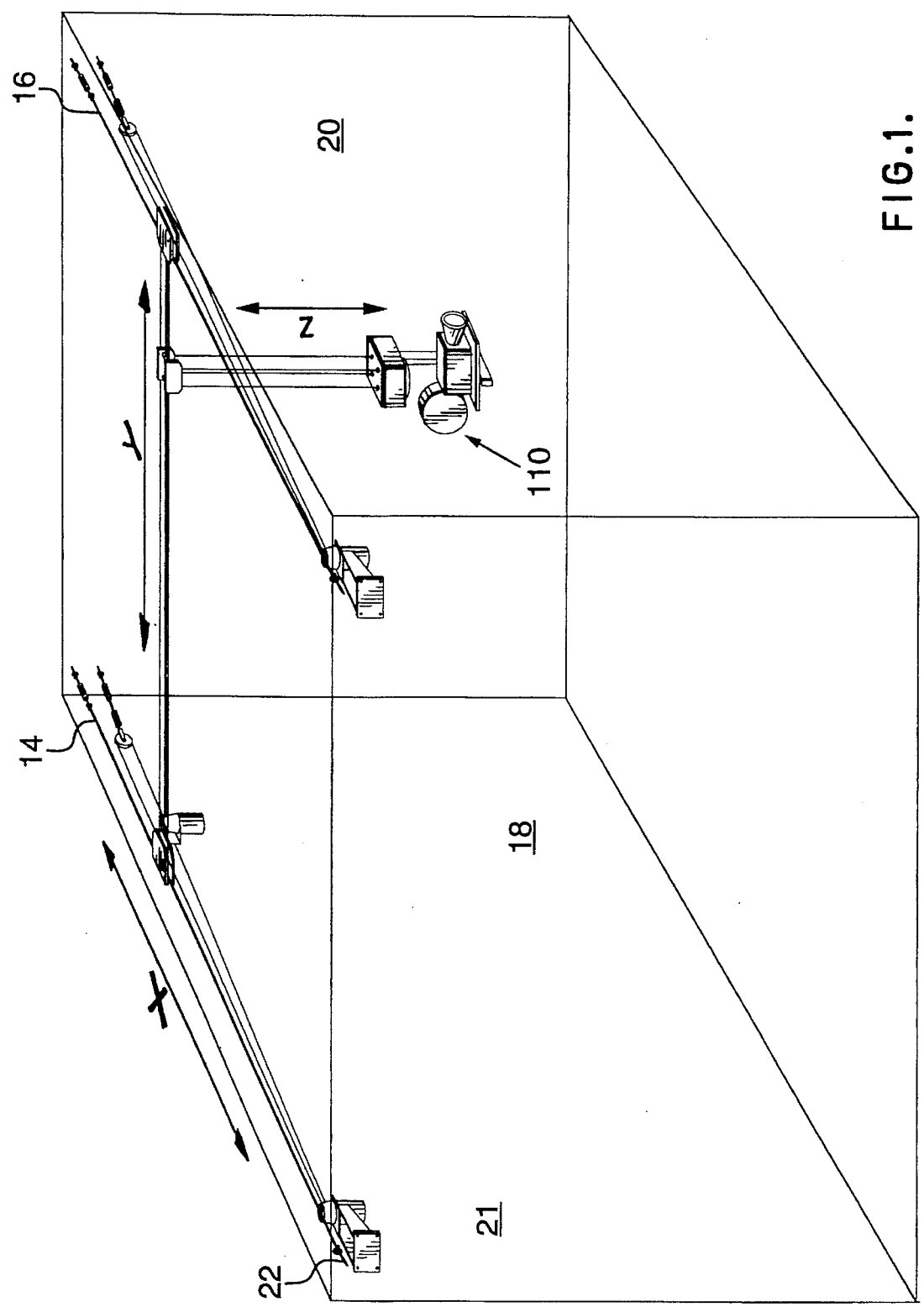
FIG. 1 is a perspective view of the aerial support platform mechanism of the invention.

A form of the aerial support platform mechanism that is used to support a camera in a studio is shown in FIG. 1. A pair of guide cables 14 and 16 each extend across a respective one of a pair of facing side walls 18 and 20 of the studio. One end of guide cable 14 is fixed to a first end wall 21 by a bracket 22. The other end of cable 14 is connected to a first end of a turnbuckle 24, the other end of which is fixed by a bracket 25 to a second end wall 26. The guide cable 16 is similarly supported on the other side wall 20. In this embodiment the guide cables 14 and 16 are each approximately fifty feet in length.

Figure 5:
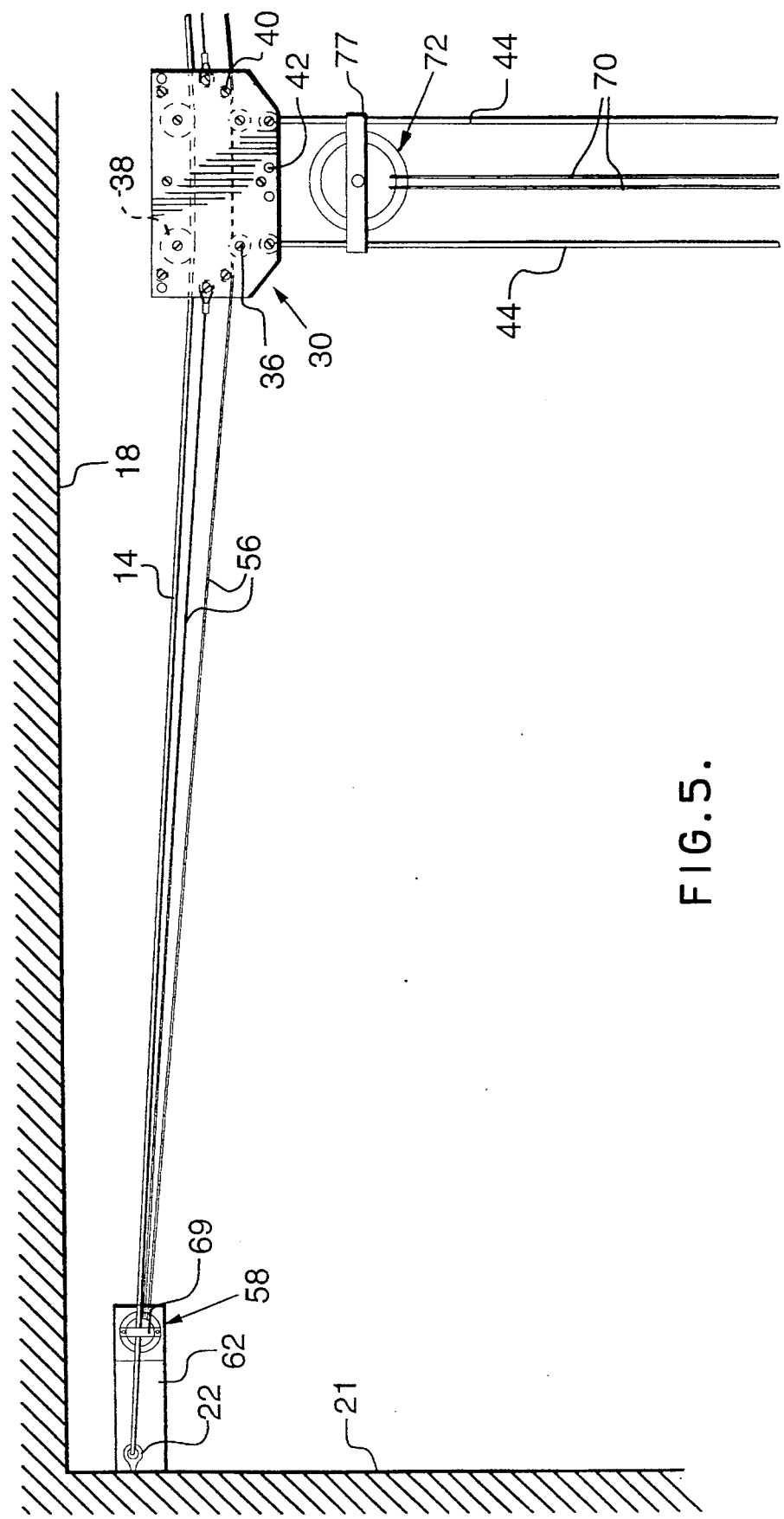
FIG. 5 is an enlarged view of a segment of the top view of FIG. 4.
Figure 6:
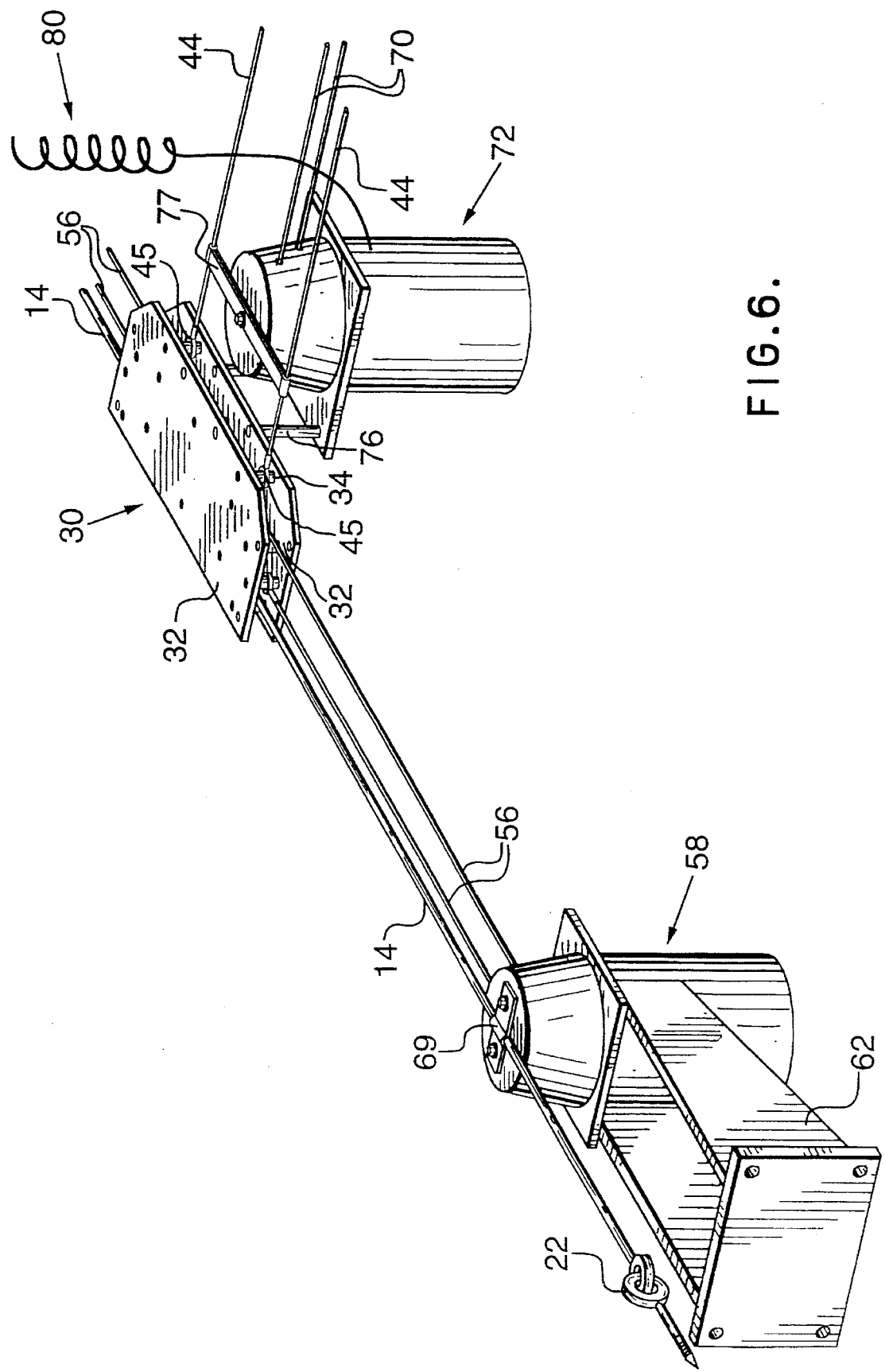
FIG. 6 is a perspective view of a first carriage and the first and second guide means.
Figure 7:
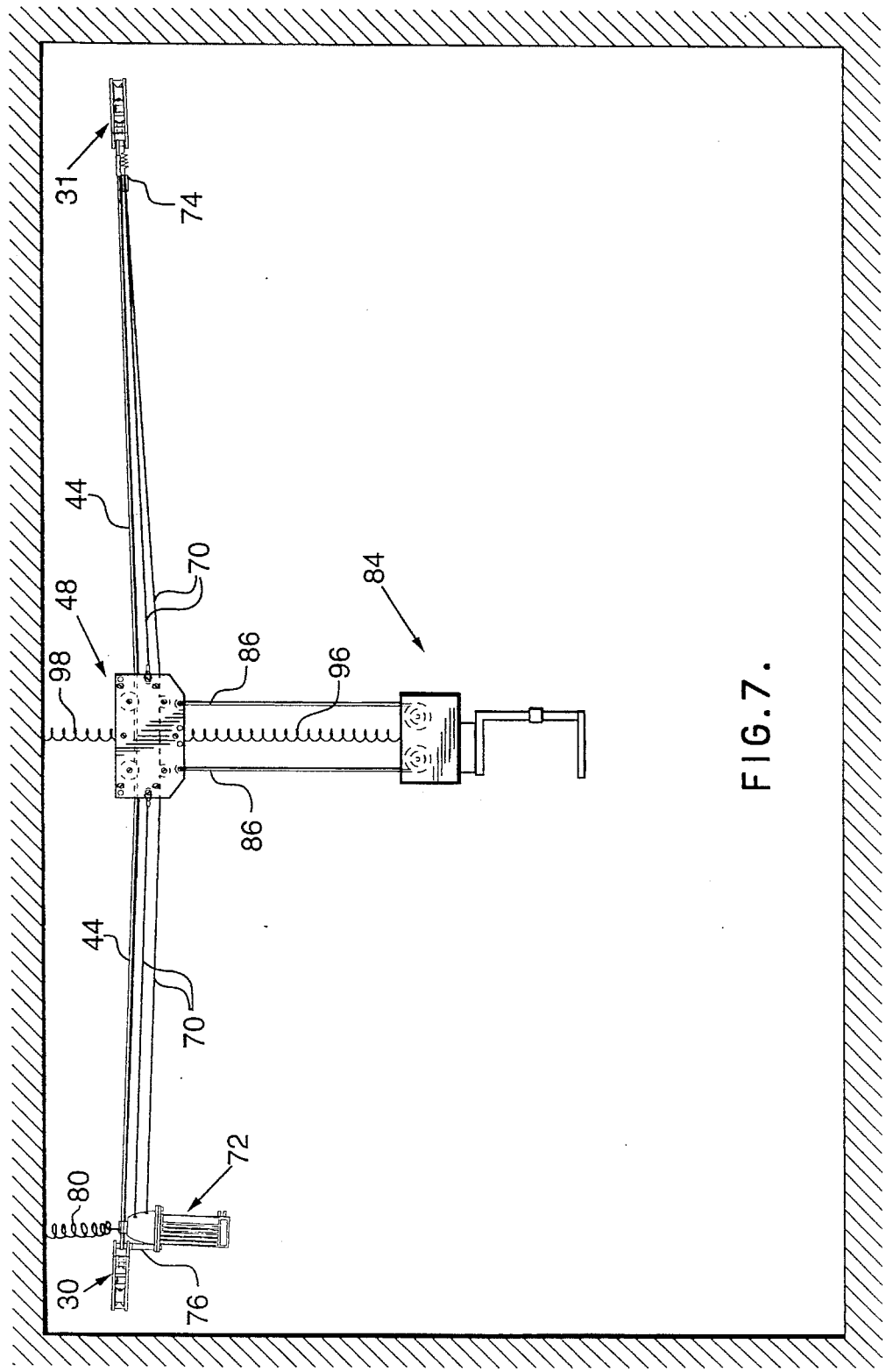
FIG. 7 is a side view of the two first carriages, the second carriage, and the second guide means for moving the second carriage.
Figure 8:
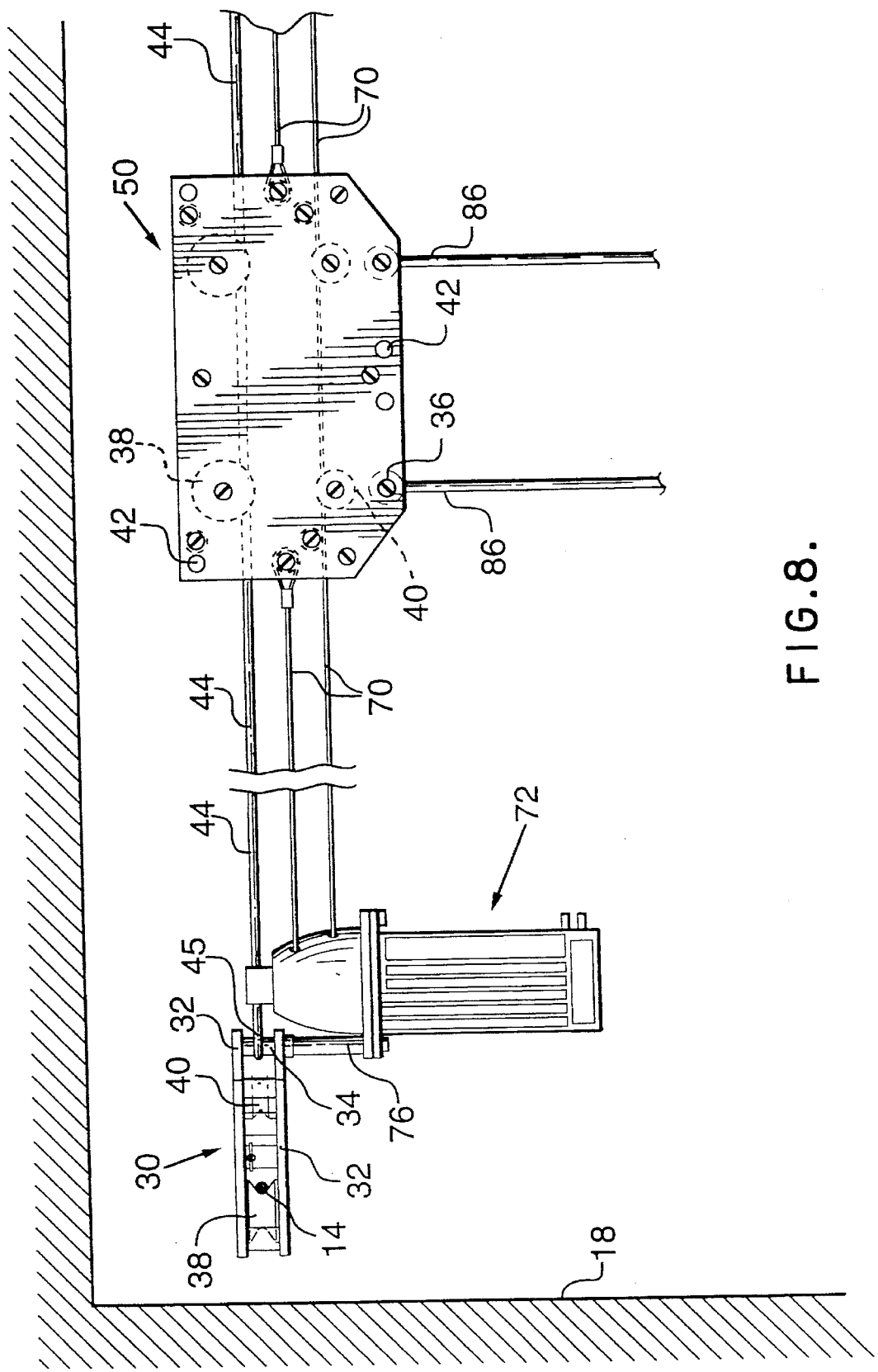
FIG. 8 is an enlarged view of a first carriage, the second carriage, and a motor for moving the second carriage on the second guide means.

Riding on guide cable 14 is a carriage generally designated 30; a similar carriage 31 rides on guide cable 16. As illustrated in FIGS. 5 and 6, the carriages 30 and 31 are each formed by a pair of generally rectangular plates 32 with a pair of angled corners. Plates 32 are held in parallel spaced relation by a series of spacers 34 mounted between them; each spacer 34 is secured to each plate 32 by a screw 36. Rotatably mounted between the plates 32 are a pair of large pulleys 38 and a pair of small pulleys 40. A series of holes 42 are positioned around the periphery of each plate 32.

Figure 9:
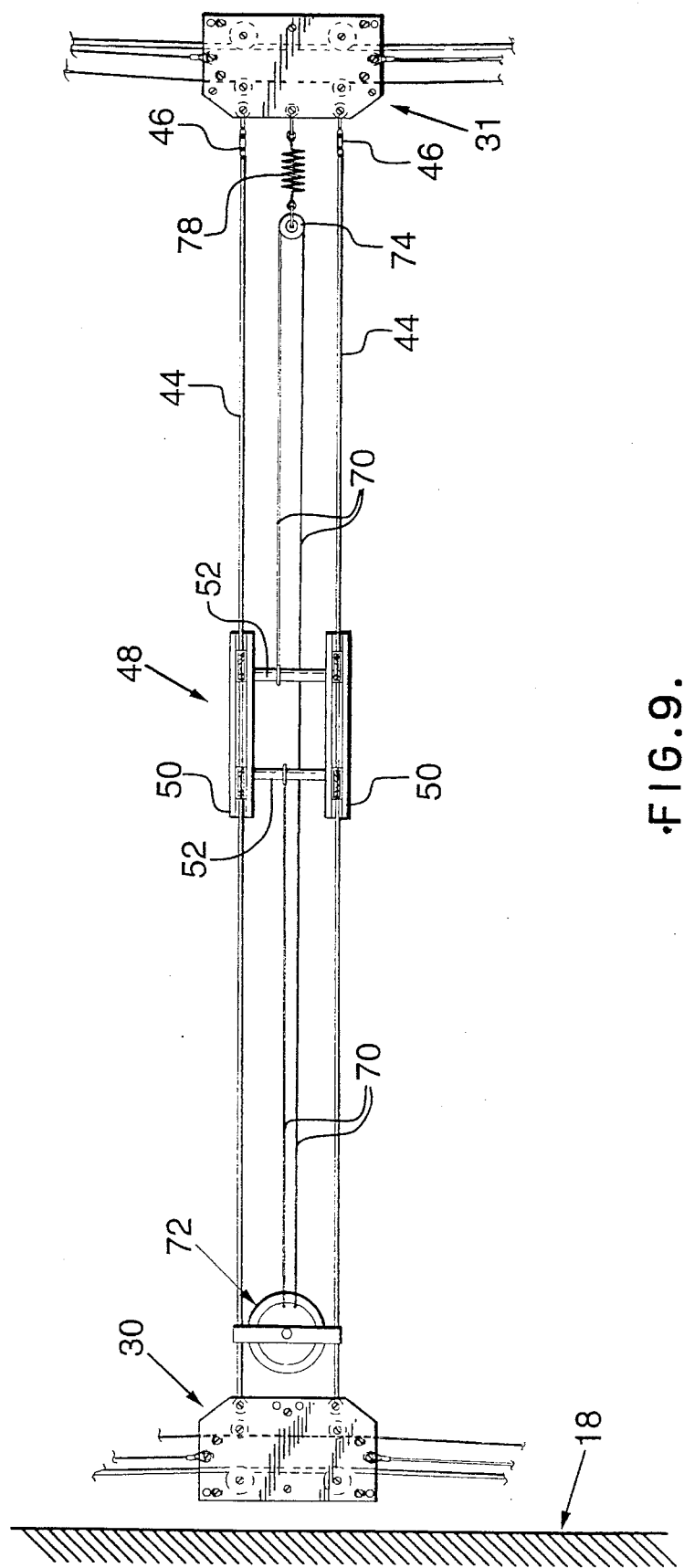
FIG. 9 is a top view of the two first carriages, the second carriage, and the second guide means of FIG. 7.
Figures 10, 11:
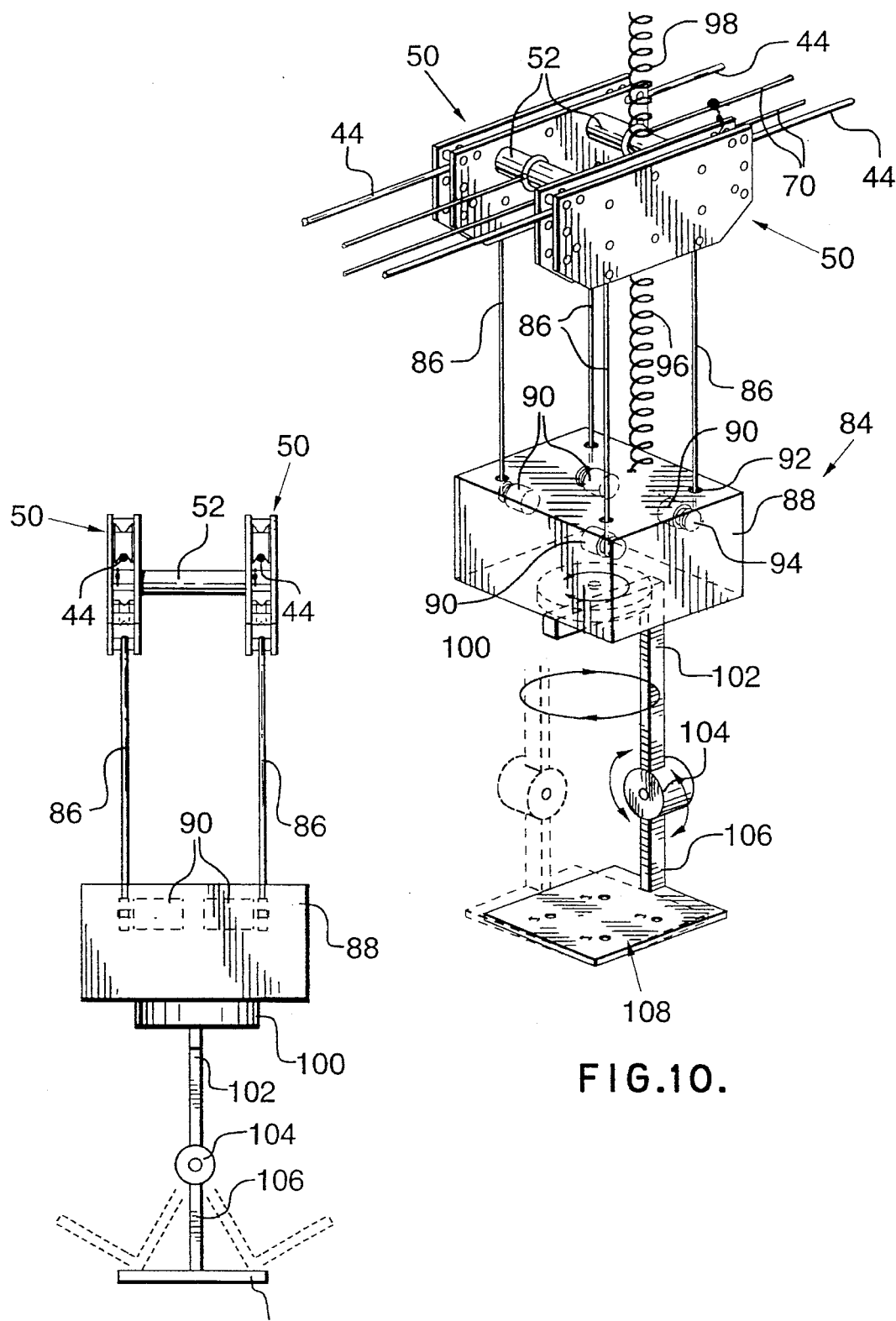
FIG. 10 is a perspective view of the second carriage, the third guide means and the platform member.
FIG. 11 is an end view of the second carriage, the third guide means and the platform member of FIG. 10.

A pair of cables 44 extend between the two carriages 30 and 31. Each end of each cable 44 terminates in a loop 45 that extends around one of the spacers 34 mounted between the pair of plates 32. Each cable 44 is connected to a turnbuckle 46 which, when rotated, increases the tension on the cable. As illustrated in FIG. 9, a carriage assembly 48 formed by a pair of carriages 50 each of similar construction to the carriages 30 and 31, rides on the pair of cables 44. The two carriages 50 are held in parallel, spaced relation by a series of struts 52.

Figure 3:
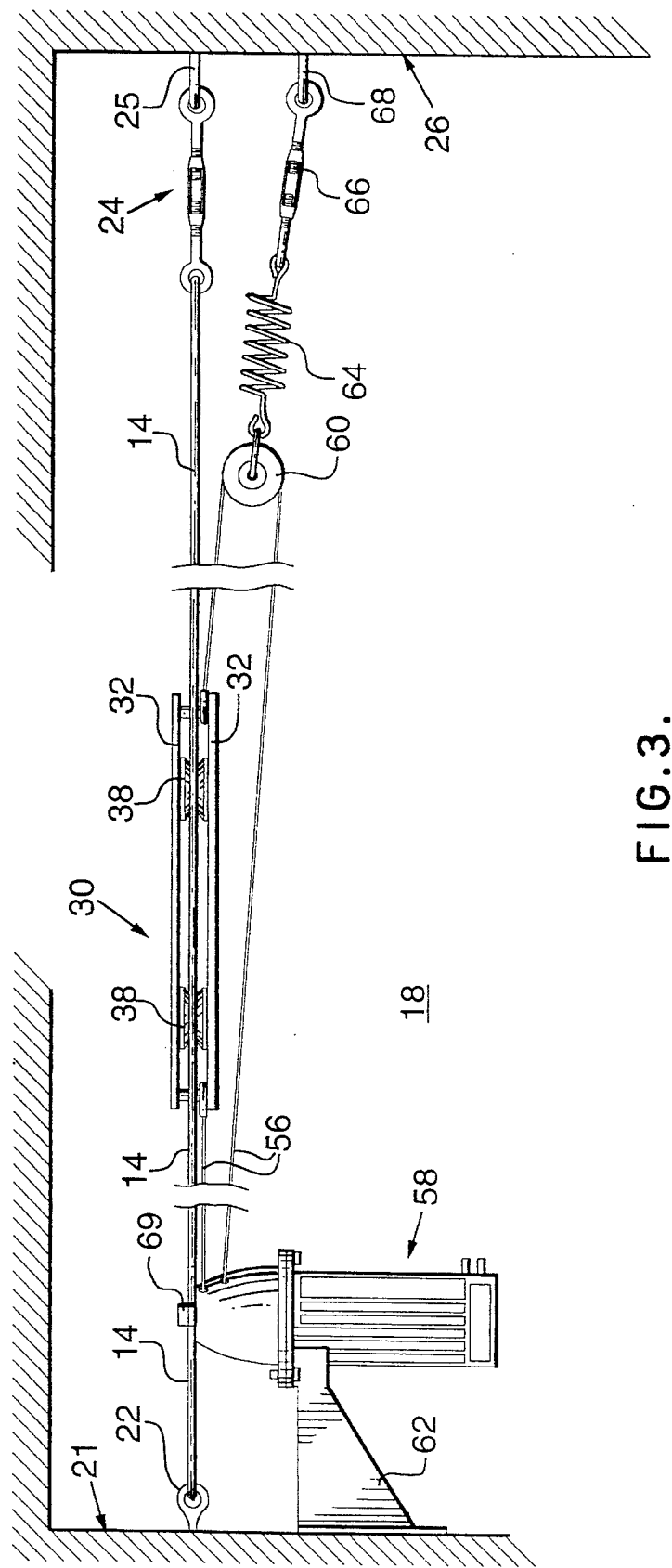
FIG. 3 is a side view of the aerial support platform mechanism of FIG. 1.
Figure 4:
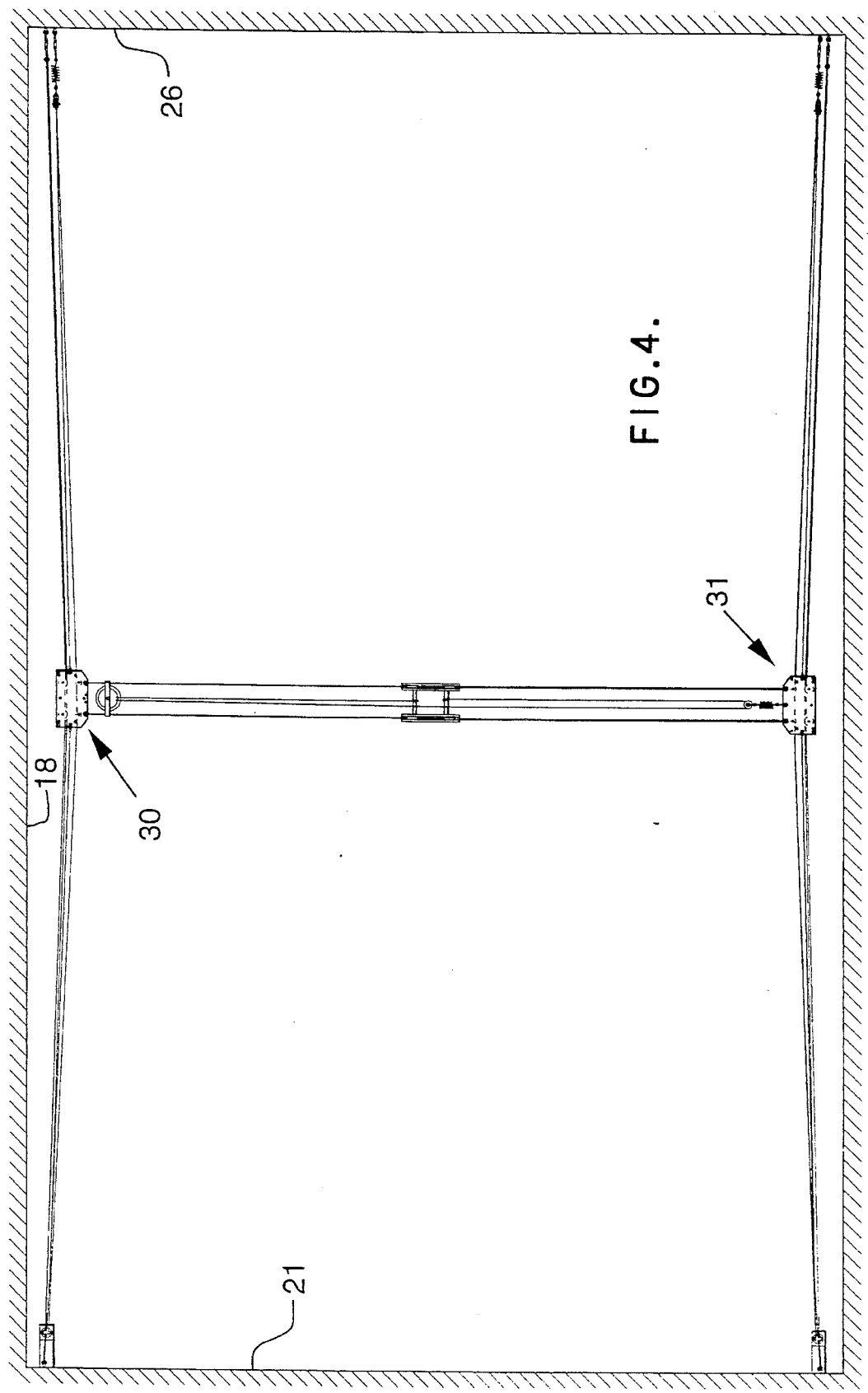
FIG. 4 is a top view of the aerial support platform mechanism of FIG. 1.

Each of the carriages 30 and 31, and the carriage assembly 48, moves by means of a respective cable loop, held between a pulley and a motor shaft, as shown in FIGS. 3 and 4. With respect to the carriages 30 and 31, a cable 56 connects to one side of each carriage, extends around a pulley (not shown) on a shaft of a motor 58, around a pulley 60, and then connects to the other side of the respective carriage. The motor 58 is mounted on the end wall 21 by a bracket 62. The pulley 60 is connected through a spring member 64 to a turnbuckle 66, which is secured to the end wall 26 by a bracket 68. A clamp 69 on the top of motor 58 secures the guide cable 14 to the motor. If the cable 14 breaks, the cable 56 prevent the carriage 30 from falling and supports that carriage until repairs are made.

A cable 70 connects to one of the struts 52 between the pair of carriages 50, extends around a pulley (not shown) on the shaft of a motor 72, extends around a pulley 74, and then connects to the another of the struts 52. The motor 72 is secured to the carriage 30 by a pair of struts 76, and is secured to the cables 44 by a bar 77. The pulley 74 is secured to a spring member 78, which in turn is secured to the carriage 31. Since the position of motor 72 changes as it moves across wall 18, a helical power line 80 is used to connect motor 72 to a ceiling power connection.

A platform member generally designated 84 is suspended by four cables 86 from the carriage assembly 50, two of the cables 86 extending from each carriage 50. Within an upper housing 88 of the platform member 84 are four motors 90. A lower part of each cable 86 enters the housing 88 through a respective opening 92 on the upper surface of housing 88, and is wound around a rotor spindle 94 on a respective one of the four motors 90. The four motors 90 are actuated simultaneously to either raise or lower the platform member 84. A helical power line 96 extends between platform member 84 and one of the carriages 50, and another connecting helical power line 98 extends between the carriage 50 and a ceiling power connection. This arrangement provides power to the motors 90 at all lateral positions of carriage assembly 48 and all vertical positions of the platform member 84.

Rotatably mounted under the housing 88 for rotation around a vertical axis is a disk 100. A motor (not shown) inside the housing 88 is adapted to rotate disk 100. Connected to the disk 100, and extending downwardly from the periphery thereof, is a strut 102. To a lower end of the strut 102 a powered joint 104 is connected. A second strut 106 is connected to joint 104, and extends downwardly of that joint to support a connected platform 108. A motor (not shown) within the joint 104 is adapted to rotate second strut 106 relative to strut 102, and thereby rotate platform 108 relative to housing 88. The power to actuate the motors which rotate the disk 100 and the platform 108 is provided through the helical power lines 96 and 98.

Figure 2:
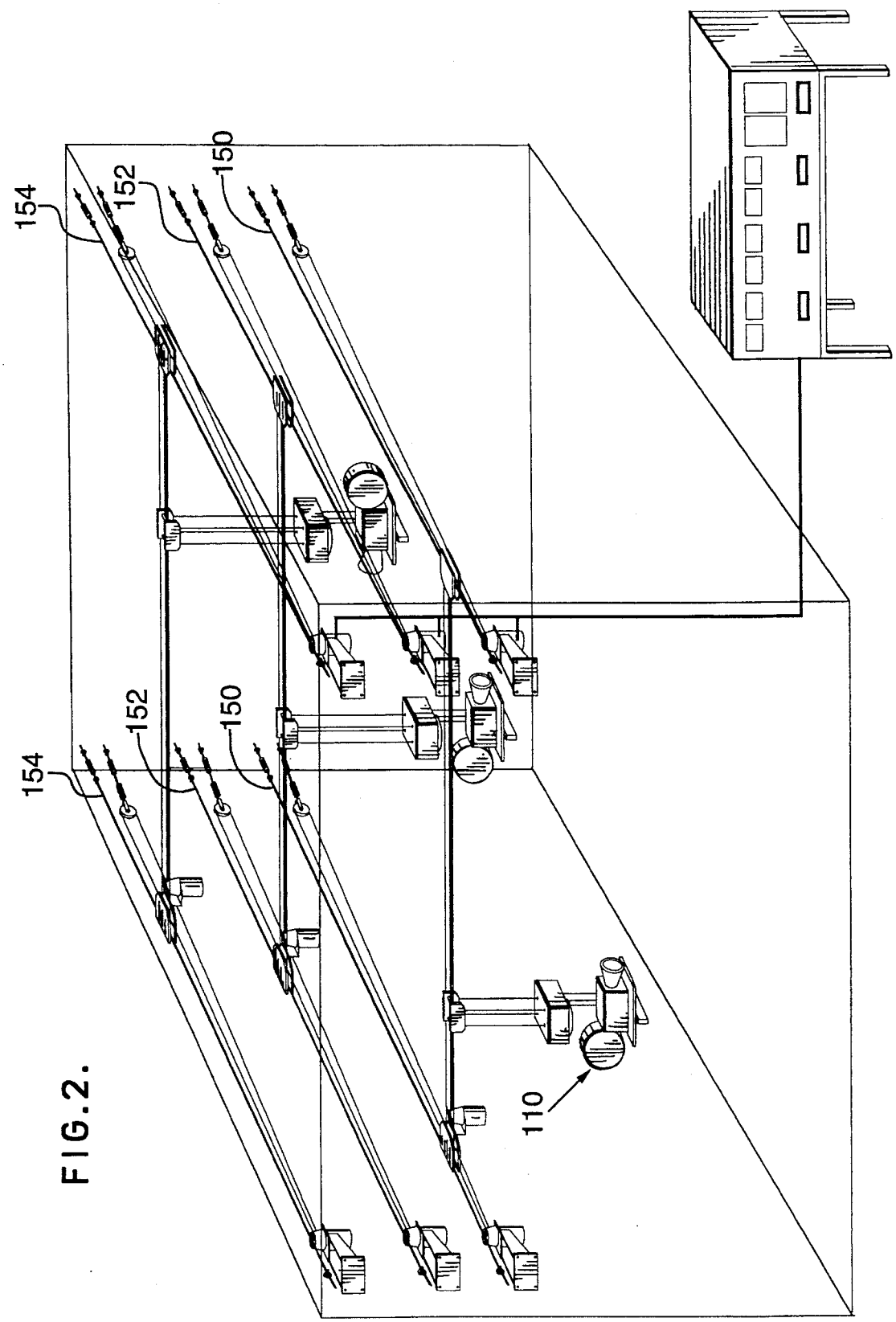
FIG. 2 is a perspective view of three of the aerial support platform mechanisms situated in close proximity.
Figure 12:
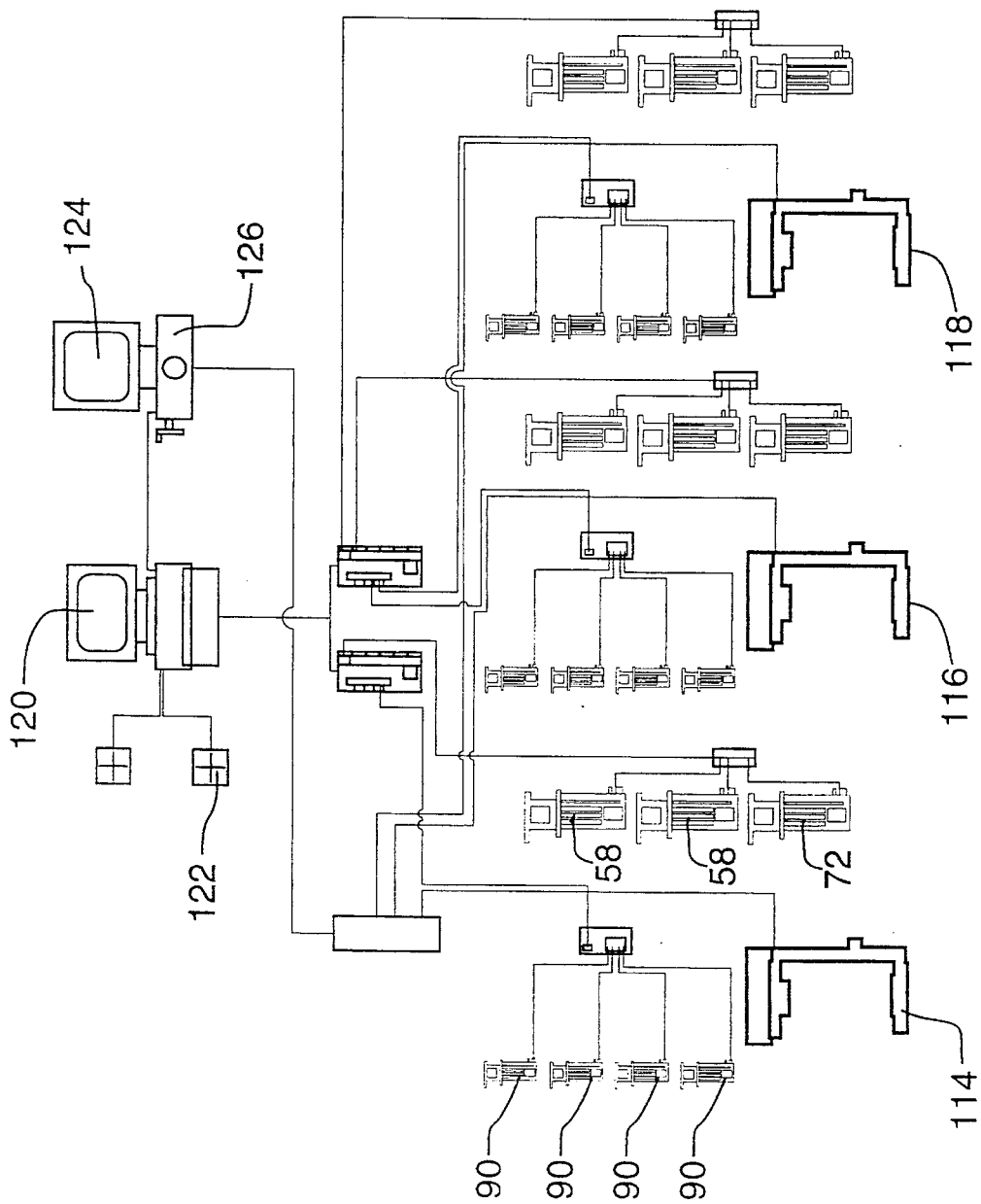
FIG. 12 is a schematic diagram of the control system utilized to operate the three aerial support platforms of FIG. 2; and, FIG. 13 is a perspective view of the platform mechanism built into a truss hoistable by a pair of cranes.
Figure 13:
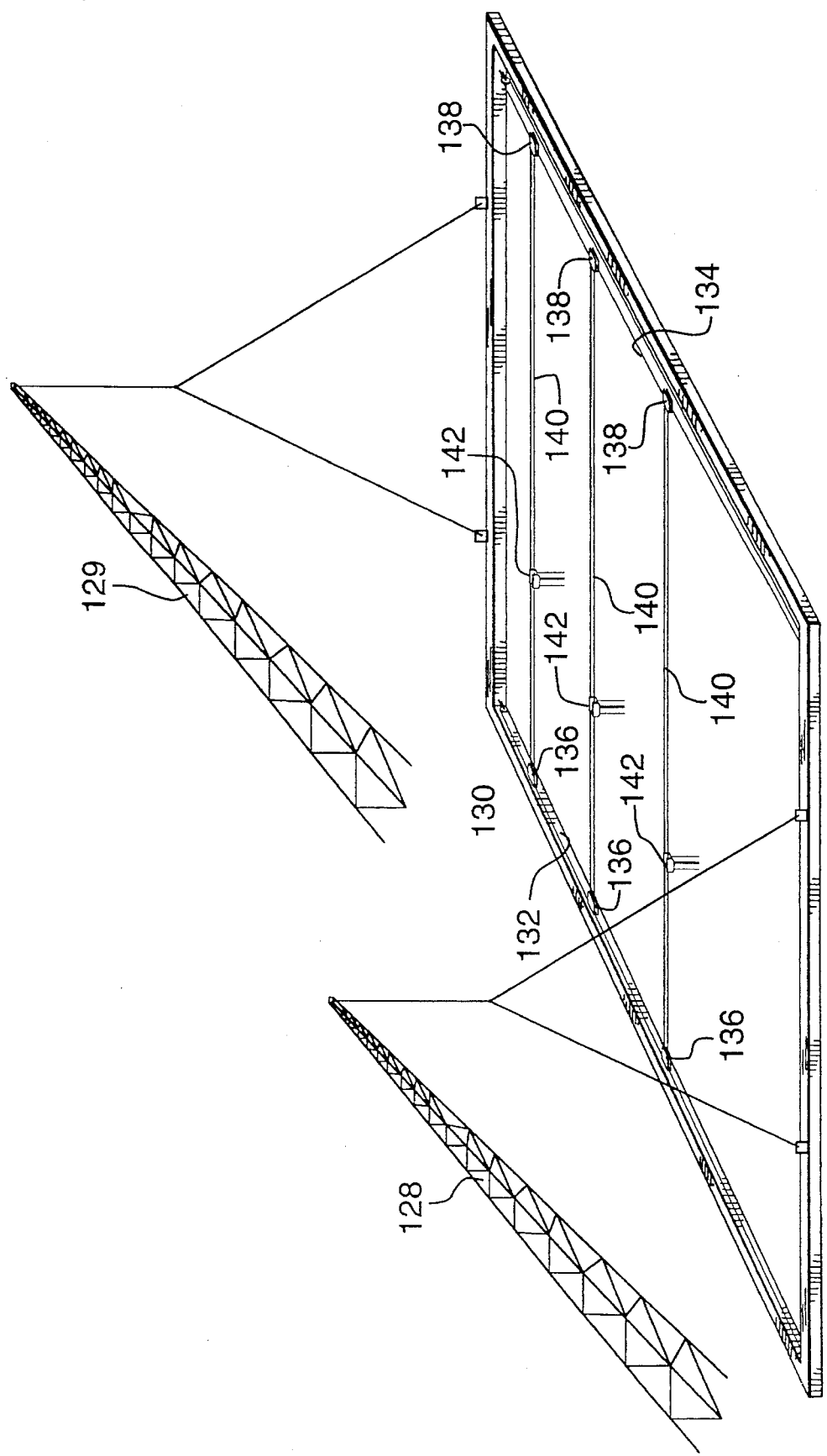

As shown in FIGS. 1 and 2, the platform 108 may be used to support a camera generally designated as 110 in a studio. With respect to the studio configuration in FIG. 2, the integrated control system of FIG. 12 is used to control five degrees of motion for each of three support platforms 114, 116 and 118. One person controls the X, Y and Z directional degrees of motion for each of the three platforms 114, 116 and 118 using monitor 120 and joystick 122, while a second person controls the two rotational degrees of motion for each of the platforms using monitor 124 and joystick 126.

Where no vertical members exist for supporting the aerial support platform of the invention, a rigid truss is used. Depending on its size, a truss may be hoisted by a single crane, or by a crane positioned on each side, or by a crane positioned at each corner. In FIG. 13, a pair of cranes 128 and 129 each connects to a respective opposite side of a truss 130. The truss 130 supports two cables 132 and 134 in a manner similar to that in which the cables 14 and 16 are supported in FIG. 1. Three carriages 136 ride on cable 132, and three carriages 138 ride on cable 134. A transverse cable 140 connects each carriage 136 with a respective carriage 138, and on each cable 140 sits a carriage 142. This configuration differs from the FIG. 2 embodiment in that movement of the three aerial support platforms is dependent on each other. In FIG. 2, there is a sufficient vertical distance between each of the three support cables 150, 152 and 154 on each side wall that each of the associated support platforms is movable to any position in the studio.

I claim:

1. An aerial support mechanism for providing five independently addressable degrees of axial freedom for a camera, said mechanism comprising:

a pair of spaced parallel first cables in support at both ends and supporting a pair of first carriages therefrom, first movement means for movement of each of said first carriages along said respective first cables;

a pair of transverse second cables extending between and affixed to said pair of first carriages for providing laterally-directed tension to said first pair of cables by way of said first carriages, said second cables terminating at one of said first carriages and tensionable terminating at the other first carriage;

a second carriage, said second carriage depending from said second cables and having second movement means for movement along said second cables;

a platform member, said platform member depending from a set of third cables fixed to and extending from said second carriage and terminating in third movement means disposed on said platform member, said third movement means for effecting movement of said platform member vertically with respect to said second carriage;

said platform member further comprising a rotatably mounted jointed means with a platform depending therefrom for supporting a camera, said jointed means rotatable about a horizontal axis by means of respective fourth movement means, and said jointed means including a fifth movement means to effect rotation of said platform about a vertical axis; and control means for remotely and independently controlling the movement of each of the respective first, second, third, fourth and fifth movement means.

2. A mechanism as in claim 14, wherein each first carriage has wheel means riding on a respective first cable and wherein said respective first movement means comprises a first cable loop disposed generally parallel to said first cables and extending between a first driven pulley and a second pulley, said first pulley and said second pulley located at opposite ends of said first cables, the first cable loop starting from said first carriage and ending thereat.

3. A mechanism as in claim 1, wherein said second carriage has wheel means riding on a respective cable of said pair of second cables, and wherein said second movement means comprises a second cable loop disposed generally parallel to said second cables and extending between, a first driven pulley depending from a respective first carriage and a second pulley depending from the other first carriage, the second cable loop starting from said second carriage and ending thereat.

4. A mechanism as in claim 1, wherein said set of third cables is a plurality of independent cables depending from said second carriage at one end and extensibly affixed to respective movement means at the other end, and wherein said respective movement means are mounted on said platform member and are reversible motors.

5. A mechanism as in claim 1, wherein said second platform is rotatably connected to said first platform by a support element for rotation around a vertical first axis, and wherein said support element is adapted to provide rotation about an axis generally normal to said first axis.

6. An aerial support mechanism for providing five independently addressable degrees of axial freedom to multiple cameras, said mechanism comprising:

a plurality of vertically spaced pairs of parallel first cables in support at both ends and supporting a respective pair of first carriages therefrom, said respective pair of first carriages having respective first movement means for movement along said respective first cables;

a plurality of pairs of transverse second cables extending between and affixed to respective pairs of said first carriages, for providing laterally-directed tension to said respective first pairs of cables by way of a respective one of said first carriages, each pair of said second cables terminating at a respective one of said first carriages and adjustably terminating at the respective other first carriage;

a plurality of second carriages, one each of said second carriages depending from a respective pair of said second cables and each of said second carriages having independent second movement means for movement along a respective pair of said second cables;

a plurality of platform members, each one of said platform members depending from a set of third cables fixed to and depending from a respective second carriage and terminating in third movement means disposed on said platform member for effecting movement of each of said platform members vertically with respect to said respective second carriage;

each of said platform members further comprising rotatably mounted jointed means with a platform depending therefrom for supporting a respective cameras said articulating means rotatable about a horizontal axis by means of respective fourth movement means, and said articulating means including a fifth movement means to effect rotation of said platform about a vertical axis; and control means for remotely and independently controlling individually the movement of each of the respective first, second, third, fourth and fifth movement means.

7. An aerial support mechanism for providing five independently addressable degrees of axial freedom to multiple cameras, said mechanism comprising:

a pair of spaced parallel first cables in support at both ends and supporting a plurality of respective pairs of first carriages therefrom, said respective pairs of first carriages having respective first movement means for movement along said first cables;

said pairs of first carriages further providing a pair of respective transverse second cables extending between and terminating at respective one of first carriages and tensionably terminating at the other respective first carriage for providing laterally-directed tension to said first pair of cables;

a plurality of second carriages one each of said second carriages depending from a respective pair of said second cables, and having respective second movement means for movement along a respective second cable;

a plurality of platform members, each one of said platform members depending from a set of third cables fixed to and depending from a respective second carriage and terminating in third movement means disposed on said platform member for effecting movement of each of said platform members vertically with respect to said respective second carriage; and control means for remotely and independently controlling individually the movement of each of the respective first, second, third, fourth and fifth movement means.

8. An aerial support platform mechanism comprising:

a first pair of support cables each affixed at each end to support means;

a pair of first carriages each moving along a respective one of said first pair of support cables;

a drive cable reciprocating each carriage of said first pair along its respective support cable, each said drive cable connected at one end to its respective carriage, passing around a resiliently mounted pulley adjacent one end of the support cable, around a reversible drive means for reciprocating said drive cable adjacent an opposite end of the support cable and connected at an opposite end to said respective carriage;

a second pair of support cables each terminating at one end to one of said pair of first carriages and adjustably terminating at the other end to the other one of said pair of first carriages, said second pair of support cables acting through said pair of first carriages to tension said first pair of support cables;

a drive cable reciprocating a second carriage along said second support cables, said drive cable connected at one end to said second carriage, passing around a pulley disposed on one of said first pair of carriages, around a reversible drive means for reciprocating said drive cable disposed on the other one of said pair of first carriages and connected at an opposite end to said second carriage;

a set of third support cables depending from said second carriage, each one of said third set of cables attached at one end to said second carriage and attached at the other end to a respective reversible drive means, said respective drive means mounted on a platform;

a support arm rotatably depending from said platform and adapted to be rotated about a vertical first axis by a first rotatable drive means, said support arm adapted to provide rotation to a second platform depending therefrom about an axis generally normal to said first axis by a second rotatable drive means; and control means for remotely and independently controlling the movement of each of said reversible drive means and said first and second rotatable drive means.

* * * * *